(12) United States Patent
Canright et al.

(10) Patent No.: US 7,889,679 B2
(45) Date of Patent: Feb. 15, 2011

(54) ARRANGEMENTS FOR NETWORKS

(75) Inventors: Geoffrey Canright, Oslo (NO); Kenth Engø-Monsen, Fredrikstad (NO); Johannes Bjelland, Oslo (NO); Richard Seyler Ling, Oslo (NO); Pål Roe Sundsøy, Oslo (NO)

(73) Assignee: Telenor ASA, Fornebu (NO)

( * ) Notice: Subject to any disclaimer, the term of this patent is extended or adjusted under 35 U.S.C. 154(b) by 189 days.

(21) Appl. No.: 12/364,136

(22) Filed: Feb. 2, 2009

(65) Prior Publication Data

US 2009/0252046 A1 Oct. 8, 2009

Related U.S. Application Data

(60) Provisional application No. 61/025,373, filed on Feb. 1, 2008.

(51) Int. Cl.
*H04L 12/28* (2006.01)
(52) U.S. Cl. ............... 370/254; 370/252; 370/398; 370/395.21; 709/226; 709/241
(58) Field of Classification Search ............... 370/252, 370/254, 398, 395.21; 709/220–226, 238–244
See application file for complete search history.

(56) References Cited

U.S. PATENT DOCUMENTS

| | | | | |
|---|---|---|---|---|
| 7,610,367 | B2 * | 10/2009 | Canright et al. ............ | 709/223 |
| 2007/0168533 | A1 * | 7/2007 | Canright et al. ............ | 709/230 |
| 2007/0250502 | A1 * | 10/2007 | Canright et al. ............ | 707/5 |
| 2008/0163063 | A1 * | 7/2008 | Bonev et al. ............... | 715/734 |
| 2009/0141652 | A1 * | 6/2009 | Canright et al. ............ | 370/254 |

FOREIGN PATENT DOCUMENTS

EP 0773698 * 5/1997

* cited by examiner

*Primary Examiner*—Aung S Moe
*Assistant Examiner*—Christopher P Grey
(74) *Attorney, Agent, or Firm*—McDermott Will & Emery LLP (57) ABSTRACT

A system for analyzing a network including a plurality of nodes associated and/or connected together by links. The system includes a processor coupled to a data memory. The processor is configured to access a first representation of the network and associated link weight measures w in the memory. Moreover, the system is configured to provide node values for the nodes and determine from the node values corresponding slope measures for links existing between the nodes, the slope measures being computed from a function of differences in node values and from the weight measures w for the links, the weight measures w being used for scaling the function of differences in nodes values; to select for at least some of the nodes one or more steepest ascent links having one or more greatest positive slope measures; and to generate a second representation corresponding to a steepest ascent graph of the network derived from information included in the steepest ascent links.

41 Claims, 6 Drawing Sheets

ARRANGEMENTS FOR NETWORKS

RELATED APPLICATIONS

This application claims the benefit of U.S. Provisional Application No. 61/025,373 Filed Feb. 1, 2008 entitled "ARRANGEMENTS FOR NETWORKS," the disclosure of which is incorporated herein by reference.

TECHNICAL FIELD

The disclosure herein relates to arrangements for networks, for example to arrangements for analyzing and/or controlling operation of networks. Moreover, the disclosure relates to methods of analyzing and/or controlling aforesaid networks. Furthermore, the disclosure concerns data analysis products generated by such methods, the analysis products enabling the networks to be effectively analyzed and comprehended. Additionally, the disclosure relates to software products executable on computing hardware for implementing such methods.

BACKGROUND

"Network" as a term is potentially capable of being applied to describe relationships between entities. For example, in FIG. 1, there is shown a network indicated generally by 10. The network 10 includes a plurality of entities 20 and relationships 30 which associate the entities 20 relative to one another; the entities 20 are conveniently referred to as being "nodes", and the relationships as being "links".

Figure 1:
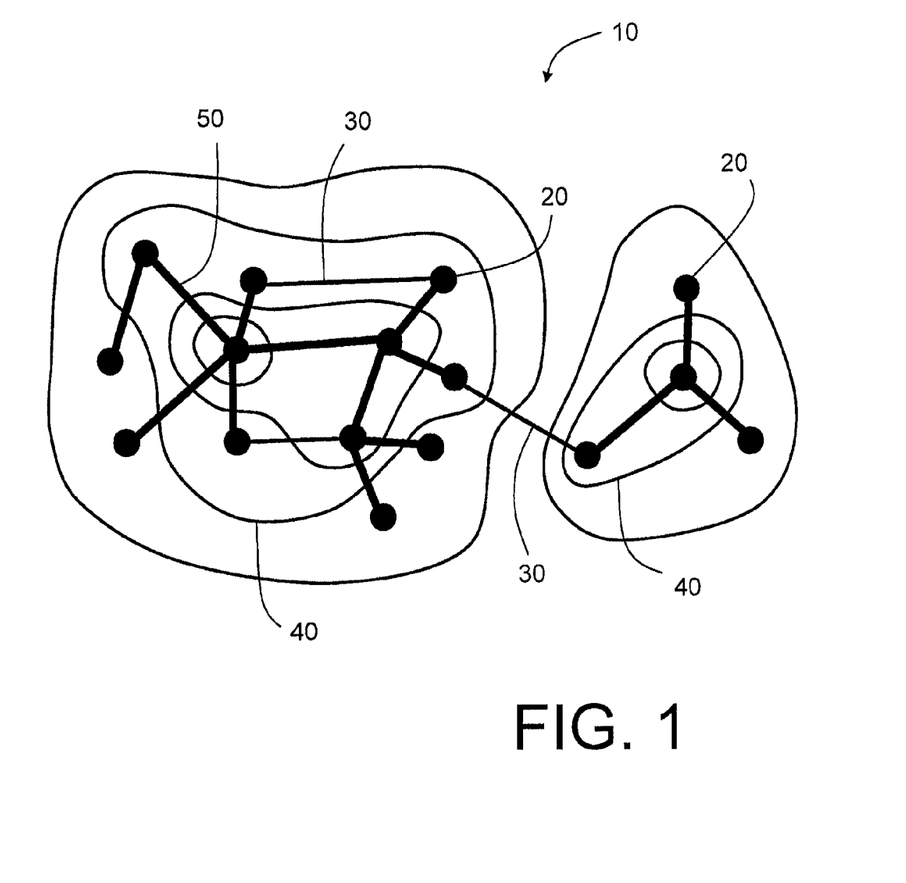
FIG. 1 is a schematic illustration of a steepest ascent graph (SAG) applied to a network of nodes.

The entities 20 can be either real physical objects or virtual objects. For example, the real physical objects include communication system nodes, cities, buildings, electricity power generators, and people. Virtual objects include, for example, collections of data, financial share holdings, personal relationships and bank accounts. The relationships 30 can also be either real physical components or virtual components. For example, the real physical components include optical fiber communication links, roads, and electrical power distribution cables. The virtual components include, for example, legal relationships, legal rights, similarities in data structures, and money. The network 10 is potentially highly complex with millions of the entities 20 being present and a correspondingly many millions of relationships 30 existing between the entities 20.

There arises a need to analyze networks, for example for purposes of searching or navigating within the networks, for controlling the networks, for controlling information flow within the networks, for reconfiguring the networks to mention a few examples. Methods of analyzing networks are known. One known method employs a "topographical" approach, wherein a network is visualized in a form akin to a 3-dimensional relief. This method employs an Eigenvector centrality (EVC) of a given node of a network to represent a degree to which the given node is connected or related to other nodes of the network. The network, when represented by Eigenvector centrality values (EVC) of its nodes, will include one or more nodes which have a peak maximum EVC value for the network, and potentially none, one or more nodes which have EVC values which are less than the peak maximum EVC value and which correspond to none, one or more local maximum EVC values within the network. The one or more nodes corresponding to the one or more local maximum EVC values define one or more corresponding "regions" of the network. In a network, the number of such "regions" found is thus equal to a number of local EVC maxima. The method employs a simple rule for assigning non-centre nodes, namely each node belongs to a same region as its neighbor having a highest EVC. This simple rule will be referred to as a "steepest-ascent rule".

A method for analyzing networks utilizing the aforementioned "topographical" approach is described by the present inventors in a published International PCT patent application WO 2007/049972. The method described in the PCT patent application is based on utilizing a steepest ascent graph (SAG). In FIG. 1, the aforesaid network 10 includes a plurality of nodes 20. The nodes 20 of the network 10 are here depicted with a topological map with iso-EVC value curves denoted by 40. The Eigenvector centrality (EVC) of each node 20 is conveniently, for topographical visualization purposes, interpreted to be an "altitude" of the node 20, and each region of nodes 20 is interpreted to be a "mountain". For each region of nodes 20, a node in the region having a highest EVC is taken to be a centre of the region, namely in a manner akin to a peak of a mountain. The nodes in each region are mutually connected by a plurality of association links represented by thin lines 30, but only links that connect a node with its neighbor having highest EVC as represented by thick lines 50 are included for deriving a SAG. These links, as represented by the thick lines 50 for the SAG, correspond to most likely paths, for example for information flow, towards the central nodes of regions. Conveniently, each region can be divided into sub-regions, wherein each neighbor of a centre node in a region is defined as being a sub-region centre node. The aforesaid method is thus susceptible to being used to analyze a network of nodes, and to find central nodes therein defining a centre of each sub-region. By applying the method to analyze a network comprising interconnected nodes, it is possible for analysis purposes to sub-divide the network into suitable sub-regions.

The aforesaid "topographical" approach has shown itself to be useful in analyzing networks, for example as a tool for understanding spreading of information within networks of interconnected nodes. As a consequence of such analysis, networks of interconnected nodes are susceptible to being reconfigured to preferentially hinder or enhance, depending on requirements, flow of information therein.

However, it is found that the "topographical" approach based on EVC, for example as elucidated in a published International PCT patent application no. WO 2007/049972, does not reveal all inherent nodal structures in all types of networks including interconnected nodes. In consequence, the aforesaid method applied in certain types of networks to control information flow therein does not provide optimal analysis, monitoring and/or control of such networks.

SUMMARY

Described herein are systems for analyzing networks, for example systems which enable the networks to be more appropriately analyzed, configured, reconfigured, searched and/or controlled.

In an embodiment of the invention, there is provided a system for analyzing a network including a plurality of nodes associated and/or connected together by links, the system including a processor coupled to a data memory, wherein the processor is configured to access a first representation of the network and associated link weight measures w in the memory, the system being configured (i) to provide node values for the nodes and determine from the node values corresponding slope measures for links existing between the nodes, the slope measures being computed from a function of differences in node values and from the weight measures w for the links, the weight measures w being used for scaling the function of differences in node values;

(ii) to select for at least some of the nodes one or more steepest ascent links having one or more greatest positive slope measures; and (iii) to generate a second representation corresponding to a steepest ascent graph (SAG) of the network derived from information included in the steepest ascent links.

The system may be configured so that the slope measures are computed from a difference in node values scaled by a function of corresponding weight measures w for the links.

The system may be configured to subject the first representation to pre-filtering for eliminating from computations a sub-set of the nodes which do not to contribute to the steepest ascent graph (SAG), for reducing a computational load on the processor.

The system may be configured to subject the steepest ascent graph (SAG) to post-filtering to remove links of the steepest ascent graph (SAG) which are irrelevant to determining operation of the network.

With regard to the system, the first representation may be a matrix representation of the network and the system may be configured to compute the node values by calculating a principal Eigenvector of the matrix representation, the matrix representation including the link weight measures w.

With regard to the system, the processor may be configured to determine the weight measures w for links in the network, and to map a topology of the network to an adjacency matrix A describing the network, wherein $A_{i,j}$=w(i, j) when a link exists between a node i and a node j, and wherein $A_{i,j}$=0 when no link exists between a node i and a node j.

The system may be configured to compute the node values by calculating a principal Eigenvector e of the matrix A, wherein e(i) is the EVC of node i.

With regard to the system, the processor may be configured to compute the centrality values (EVC) as Eigenvector centrality (EVC) values for the nodes, and to determine, for each node g in the network, a slope measure for each link from the node g to an adjacent node h, according to a slope from the node g to the node h being computed from (EVC(h)−EVC(g))·P[w(g, h)], wherein EVC(h) is the Eigenvector centrality value (EVC) for the node h, EVC(g) is the Eigenvector centrality value for node g, and w(g, h) is the weight measure for the link between the node g and the node h, and P is a function.

The system may be configured, when generating the second representation, to set a pointer from each node i to its neighbor j having a steepest ascent link from the node i. The system may be configured to generate the second representation by setting a pointer from each node i to itself if it has no positive slope to any of its neighboring nodes.

The system may be configured to generate the second representation by creating a matrix $\tilde{A}$ representing a steepest ascent graph (SAG) of the network, wherein entries of the matrix $\tilde{A}$ corresponding to the steepest ascent links are set to 1, and wherein the matrix element $\tilde{A}_{i,i}$ is set to 1 if the node i has no positive slope to any one of its neighboring nodes.

The system may be configured: (a) to multiply a start vector $s_i$=i, wherein i is the node number, with the matrix $\tilde{A}$; (b) to repeat the multiplication in (a) until the start vector s converges to a stable vector s*; and (c) to derive the region membership of each node from the stable vector s*.

The system may be configured: (d) to identify nodes which are local maxima of the steepest ascent graph (SAG) as center nodes; (e) to group the nodes into regions surrounding each identified center node; (f) to remove the center nodes and the links to the center nodes from the steepest ascent graph (SAG); (g) to identify neighboring nodes of the center nodes as head nodes; and (h) to group nodes into sub-regions surrounding each identified head node, the nodes of a sub-region being linked to the head node of that sub-region in the steepest ascent graph (SAG).

The system may be configured: (o) to identify neighboring nodes of the head nodes as sub-subregion head nodes; and (p) to group nodes into sub-subregions surrounding each identified sub-subregion head node, the nodes of a sub-subregion being linked to the sub-subregion head node in the steepest ascent graph (SAG).

The weight measure w may be defined as 1/dist(g, h), where dist(g, h) is a distance measure between the nodes g and h.

The function P may be a monotonically increasing function in response to the weight w increasing.

The processor may be configured to generate an analysis data product corresponding to one or more of the significant links present in the network.

The processor may be configured to present the analyzed second representation of the network on a display.

The processor may be configured to apply the second representation for controlling operation of the network.

The processor may be configured to use the second representation for one or more of:

(a) defining and selecting groups of nodes, for which internal spreading is expected to be rapid;

(b) defining and selecting paths (sets of connected links) in the network, over which spreading is expected to be rapid;

(c) acting upon and/or modifying the selected nodes and/or links so as to improve network performance; and (d) presenting in a display the selected nodes and/or links for informing and supporting human intervention in the network's operation.

The system may be optionally configured so that the first representation is generated by a server analyzing data communication traffic between members in a communication network. The server may be operable to generate weight measures w indicating the existence of relations between the members. The members may be users of communication devices interacting with the communication network. The data communication network may be the Internet, an intranet or a telecommunication network. The telecommunication network may be a mobile telecommunication network. The data communication traffic may be generated by users sending email, instant messages, voice calls or video calls. The weight measures w may indicate at least one of: how frequently the members interact, and how much information is exchanged between the members.

The system may be optionally configured so that the first representation is generated by a server analyzing content generated by members of a data communication network. The server may be operable to generate weight measures w indicating the existence of similarities between the content. The members may be users of communication devices. The content may be member profiles of an online community. The profiles may be user-entered. The first representation may be generated using a combination of traffic and content analysis of the data communication network and its members.

The system may be optionally configured so that the first representation is generated by a server monitoring an electrical power distribution network. The server may be operable to generate weight measures w indicating the probability for propagation of a failure or breakdown from neighboring nodes in the network. The nodes may be at least one of: power users, sub-station switching nodes and power stations.

The system may be optionally configured so that the first representation is generated by a server analyzing statistical data about a plurality of persons. The statistical data may be the result of a survey targeted at the persons. The server may be operable to generate weight measures w indicating the existence and nature of phenomena experienced by respondents of the survey. The phenomena may be diseases.

The system may be optionally configured so that the first representation is generated by a server analyzing a set of electronic documents in a database. The server may be operable to generate weight measures w indicating similarity between the documents. The documents may be retrieved from governmental, medical, or educational records. The documents may be internal to an organization or be publicly available.

The system may be optionally configured so that the first representation is generated by a server analyzing data in a database. The server may be operable to generate weight measures w indicating similarity between characteristics of objects. The objects may be at least one of: molecules, genes, species, goods, materials. The materials may be wines, and the characteristics may be wine tastes.

There is provided a method of analyzing a network including a plurality of nodes associated and/or connected together by links, the method employing a processor coupled to a data memory, wherein the processor is configured to access a first representation of the network and associated link weight measures w in the memory, the method comprising steps of:
(i) computing node values (EVC) for the nodes and determining from the node values corresponding slope measures for links existing between the nodes, the slope measures being computed from a function of differences in node values and from the weight measures w for the links, the weight measures w being used for scaling the function of differences in node values;
(ii) selecting for at least some of the nodes one or more steepest ascent links having one or more greatest positive slope measures; and
(iii) generating a second representation corresponding to a steepest ascent graph (SAG) of the network derived from information included in the steepest ascent links.

The method may comprise a step of the slope measures being computed from a difference in node values scaled by a function of corresponding weight measures w for the links.

The method may comprise a step of subjecting the first representation to pre-filtering for eliminating from computations a sub-set of the nodes which do not contribute to the steepest ascent graph (SAG), for reducing a computational load on the processor.

The method may comprise a step of subjecting the steepest ascent graph (SAG) to post-filtering to remove links of the steepest ascent graph (SAG) which are irrelevant to determining operation of the network.

The method may comprise steps of: determining the weight measures w for links in the network, and mapping a topology of the network to an adjacency matrix A describing the network, wherein $A_{i,j} = w(i, j)$ when a link exists between a node i and a node j, and wherein $A_{i,j} = 0$ when no link exists between a node i and a node j.

The method may comprise computing the node values as Eigenvector centrality values for the nodes, and for determining, for each node g in the network, a slope measure for each link from the node g to an adjacent node h, according to a slope from the node g to the node h being computed from $(EVC(h) - EVC(g)) \cdot P[w(g, h)]$, wherein EVC(h) is the Eigenvector centrality value for the node h, EVC(g) is the Eigenvector centrality value for node g, and w(g, h) is the weight measure for the link between the node g and the node h, and P is a function.

The method may comprise a step of generating the second representation by setting a pointer from each node i to its neighbor j having a steepest ascent link from the node i. More optionally, the method comprises a step of generating the second representation by setting a pointer from each node i to itself if it has no positive slope to any of its neighboring nodes.

The method may comprise a step of generating the second representation by creating a matrix $\tilde{A}$ representing a steepest ascent graph (SAG) of the network, wherein entries of the matrix $\tilde{A}$ corresponding to the steepest ascent links are set to 1, and wherein the matrix element $\tilde{A}_{i,i}$ is set to 1 if the node i has no positive slope to any one of its neighboring nodes.

The method may further comprise steps of: (a) multiplying a start vector $s_i = i$, wherein i is the node number, with the matrix $\tilde{A}$; (b) repeating the multiplication in (a) until the start vector s converges to a stable vector s*; and (c) deriving the region membership of each node from the stable vector s*.

The method may further comprise steps of: (d) identifying nodes which are local maxima of the steepest ascent graph (SAG) as center nodes; (e) grouping the nodes into regions surrounding each identified center node; (f) removing the center nodes and the links to the center nodes from the steepest ascent graph (SAG); (g) identifying neighboring nodes of the center nodes as head nodes; and (h) grouping nodes into sub-regions surrounding each identified head node, the nodes of a sub-region being linked to the head node of that sub-region in the steepest ascent graph (SAG).

The method may further comprise steps of: (o) identifying neighboring nodes of the head nodes as sub-subregion head nodes; and (p) grouping nodes into sub-subregions surrounding each identified sub-subregion head node, the nodes of a sub-subregion being linked to the sub-subregion head node in the steepest ascent graph (SAG).

The weight measure w may be defined as 1/dist(g, h), where dist(g, h) is a distance measure between the nodes g and h.

The function P may be a monotonically increasing function in response to the weight w increasing.

The method may further comprise generating an analysis data product corresponding to one or more of the significant links present in the network.

The method may comprise presenting the analyzed second representation of the network on a display.

The method may further comprise applying the second representation for controlling operation of the network.

The method may include a step of operating the processor to use the second representation for one or more of:
(a) defining and selecting groups of nodes, for which internal spreading is expected to be rapid;
(b) defining and selecting paths (sets of connected links) in the network, over which spreading is expected to be rapid;
(c) acting upon and/or modifying the said selected nodes and/or links so as to improve network performance; and
(d) presenting in a display said selected nodes and/or links for informing and supporting human intervention in the network's operation.

There is provided a data analysis product representative of a network including a plurality of nodes associated and/or connected together by links, the data product being generated by a method pursuant to any of the methods described above.

There is provided a computer program product comprising computer software code portions for performing steps of any of the methods described above when executed on a processor.

There is provided an article of manufacture comprising a machine readable storage medium; and a programming embodied on the storage medium, configured for execution by a processor, the processor being coupled to a data memory and operable to generate, in said memory a first representation of a network including a plurality of nodes associated and/or connected together by links; wherein execution of the programming by the processor causes the processor to execute any of the methods described above.

The nodes are optionally, for example, objects which are interrelated in some manner. Moreover, the method relies on using a measure of the weight for the links in order to find meaningful sub-groups of nodes.

Conventionally, a definition of ascent is a difference in analogous altitude, namely $\Delta$EVC, for finding a steepest ascent graph (SAG). Embodiments of the present invention employ a characteristic that information about the strength of a given link is susceptible to being considered not only when determining the node value of each node, such as an EVC value, but also when determining the steepest ascent in the process of creating the steepest ascent graph (SAG).

The novel definition of slope pertaining to the disclosure herein is capable of providing considerable improvements by taking account of useful information in the strengths of links of the network; the method may be used to assign nodes to regions in a different way in comparison to conventional practice, thereby providing new insight when visualizing substructure in each region of the network.

Optionally, the weight of a link is in turn defined as the inverse of a distance measure, dist(i, j). The definition of slope then intuitively resembles a physical slope defined by a difference in analogous altitude divided by a distance measure. In terms of the network entities, the slope between two links g and h separated by distance dist(g, h) becomes $\Delta$EVC/dist(g, h).

The aforementioned device and method described herein is susceptible to being applied to real networks and also to theoretical networks. When applied to real communication networks, for example, strengths of communication links are susceptible to being determined to information traffic flows occurring through the communication links and/or by sending test signals via the communication links. In such a manner, measurements are susceptible to being employed to determine strengths of communication links within a communication network. When the network includes objects interlinked or otherwise associated in some manner, characteristics of the objects are optionally determined, for example by sensing.

Additional novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below. It will be appreciated that features described herein are susceptible to being combined in any combination without departing from the scope of the appended claims.

BRIEF DESCRIPTION OF THE DRAWINGS

The drawing figures depict concepts by way of example, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

A technical problem which embodiments of the present invention seek to address is to provide methods of analyzing networks, for example for providing greater insight into a manner in which the networks are arranged, for example at least one of:

(a) providing greater insight into a manner in which the networks are configured; and
(b) finding network structure which earlier methods are unable to identify.

Another technical problem which embodiments of the present invention seek to address is to provide methods of controlling networks by analyzing the networks in a manner providing more insight regarding the structure of the network and thereby enabling the network to be more appropriately controlled, for example by applying feedback thereto.

Conventional methods of computing node values, for example Eigenvector centrality (EVC) values, and determining a corresponding steepest ascent graph (SAG) are described in detail in published international PCT patent application nos. WO 2005/064850 and WO 2007/049972, the disclosures of which are incorporated herein by reference. These PCT patent application nos. WO 2005/064850 and WO 2007/049972 describe a method of computing Eigenvector centrality (EVC) values and corresponding steepest ascent graphs (SAG); the method includes steps of:

STEP 1: for a network of interconnected nodes, determining weights w(g, h) for the nodes, wherein w(g, h) describes a weight w between a node g and a node h of the network; for example, the weight w can represent:

(a) the volume of communication between persons in a social network; or
(b) the nodes can be documents in a collection, and w can represent a measure of the similarity between documents;

STEP 2: building an adjacency matrix A for the network, wherein elements $A_{i,j}$ are representative of the aforementioned weights w; a given element $A_{i,j}=$w(i, j) if a link exists between a node i and a node j of the network, and $A_{i,j}=0$ in an event that no link exists between the node i and the node j; by such an step, links between nodes are represented with non-zero values and an absence of a link being denoted by a zero value;

STEP 3: computing Eigenvector values e for the nodes described in the adjacency matrix A, namely a value e(i) corresponds to an Eigenvector centrality (EVC) of a node i; a greatest value $e_{max}$ amongst the computed Eigenvector centralities (EVC) corresponds to a maximum Eigenvector centrality value;

STEP 4: computing Eigenvector centrality (EVC) slopes, wherein an Eigenvector centrality (EVC) slope p from a node g to a node h is computed from p(g, h)=e(h)−e(g);

STEP 5: identifying, for each node g, a steepest ascent p(g, h*) to a neighboring node h*, the steepest ascent p(g, h*) being a largest positive EVC slope from the node g to its neighboring node h*;

STEP 6: creating, from the set of steepest ascent links p(g, h*), a transformed matrix Ã, wherein the transformed matrix has elements Ã(g, h*)=1; and STEP 7: for those nodes k which do not have a positive EVC slope p to any of their neighbors, those nodes are Centers which are higher than all their neighbors, for which the matrix Ã is adjusted so that its element $\tilde{A}_{k,k}=1$.

The matrix Ã generated in STEP 7 represents a steepest ascent graph (SAG), and has by definition exactly one entry per row of the matrix Ã—corresponding to one pointer per node in the SAG. Nodes having neighbors with higher EVC receive in STEP 6 a pointer to that neighbor having the steepest ascent as defined in STEP 5. These nodes whose EVC exceeds that of corresponding neighboring nodes are local maxima, and are denoted as centre nodes. The centre nodes are represented on the aforementioned steepest ascent graph (SAG) by having a pointer to themselves as in STEP 7.

The matrix Ã provides a computed end result which can be used to find for any given node a corresponding centre node to which the given node belongs. Such association of nodes to find a pertinent centre node is susceptible to being computed by multiplying a column vector s, wherein each entry $s_i$ in the vector s is equal to the row number ($s_i$=i), by the matrix Ã repeatedly, until a result thereby generated converges to a vector s*, wherein the vector s*(g) is equal to the node number of the center to which a given node g belongs.

It will be appreciated in the aforesaid STEP 4 that the EVC slope p between two nodes g and h is conventionally defined from a difference in node values. The EVC slope p is optionally a polynomial function of differences in EVC values, for example the polynomial function can be simply the difference in EVC values. If the EVC is considered analogous to an altitude, the EVC slope p is thus optionally defined pursuant to Equation 1 (Eq. 1):

EVC slope from g to h=(Δy)(g→h)=(EVC(h)−EVC(g))  Eq. 1

STEP 1 to STEP 7 correspond to a known computational approach. However, this approach does not exploit all information that is present in a given network. In particular, no consideration is given to the strength for the links in the network. Also, it can be useful to include other measures of height than simply the EVC. In consequence, the known approach results in potentially incorrect decisions being made when controlling the network, or planning to modify the network, for example to control pathways of information flow therein. Embodiments of the present invention provide an alternative approach to visualizing and controlling a given network which at least partially addresses problems associated with known approaches.

Embodiments of the present invention are fundamentally differentiated from aforesaid conventional approaches. A slope may be defined so that slope takes into consideration a measure representing a weight of each link. The measure is beneficially an increasing function as the weight increases. Beneficially, the increasing function is monotonic, for example devoid of any local inflections resulting in local gradient reversals. Optionally, the increasing function is a stepwise increasing function. Optionally, embodiments are not limited to the slope merely increasing in proportion to the weight, but may include other functions P of the weight w, for example polynomial functions P of the weight w.

In some embodiments, it is convenient to make an assumption that the weight w is symmetrical, namely independent of a direction of a given link which the weight w describes, for example such symmetry results in w(g, h)=w(h, g) for a link between the nodes g and h. Symmetrical links are characteristic of for example: some kinds of communication networks; networks of documents, where the link strengths are document similarities; friendship networks; and networks of transmission probabilities for some types of diseases.

In some embodiments, the weight w may be asymmetrical for some or all links, namely dependent on a direction of a given link which the weight w describes, for example such asymmetry may result in w(g, h)≠(h, g) for a link between the nodes g and h. Asymmetrical links are characteristic of for example: communication networks in which the communication is asymmetric (e.g. email networks); affinity measures for biological sequence data; hyperlinks in the World Wide Web; and transmission probabilities for some diseases such as sexually transmitted diseases.

A definition of slope as discussed herein is susceptible to being appreciated, for example, to being an analogous concept of "slope", the slope being defined as $F_1[\Delta y]/F_2[\Delta x]$ wherein $F_1$ and $F_2$ are functions, for example polynomial functions. In a simple example, the functions $F_1$ and $F_2$ is a unity scaling coefficient so that the slope is simply defines as Δy/Δx. Optionally, for example in a smoothly changing network, the slope Δy/Δx is computed by computing a gradient of a function which encompasses more than two (x, y) coordinate pairs, for example some manner of differential of a spline fit. It is convenient to define the slope using Δy analogous to "vertical height" and Δx analogous to "horizontal distance" as in Equation 1.

Conveniently, a high link weight is analogously equated with a short distance, and a low link weight analogously equated with a long distance. A simple relationship would then be, for example, Δx=1/w wherein P(w)=w, although other relationships of the weight w are possible and defined by a function P(w).

Also, it is convenient to define the height Δy as corresponding to v(h)−v(g), namely the difference between a node value for node h and a node value for node g. The node value v for a node represents a quantity, for example a retrieved or measured quantity for the node or a result of a computation for the node. Optionally, the node value v for a node represents a result of a computation applied on at least two attributes of the node. For example, the result may be a score for a past performance or a probability of a future event or of an estimated activity related to the node. Optionally, the node value v for a node may alternatively or in addition represent a result of a computation for one or more attributes of neighboring nodes of the node.

In an embodiment, the height Δy corresponds to EVC(h)−EVC(g), namely the difference between the EVC value for node h and the EVC value for node g. Optionally, the height Δy corresponds to a polynomial function $\Delta y = a_0 + a_1[EVC(h) - EVC(g)] + a_2[EVC(h) - EVC(g)]^2 + \ldots + a_n[EVC[h] - EVC(g)]^n$ wherein n is an integer, and $a_0$ to $a_n$ are coefficients.

Incorporating such an analogous assumption into Equation 1 (Eq. 1) results in a relationship in Equation 2a (Eq. 2a):

$$\text{slope from } g \text{ to } h = (\Delta y/\Delta x)(g \to h) = Q[v(h),v(g)] \cdot P[w(g,h)] \quad \text{Eq. 2a}$$

where Q is a function substantially increasing with difference in height. For example, when $Q[v(h), v(g)] = (v(h)-v(g))$, then $$\text{slope for } g \text{ to } h = (\Delta y/\Delta x)(g \to h) = (v(h)-v(g)) \cdot P[w(g,h)] \quad \text{Eq. 2b}$$

Equation 2b (Eq. 2b) has been shown to give satisfactory results for a variety of situations involving link strengths. Other useful relationships for defining "distance" in the function P may optionally be used, with the constraint that increasing link strength typically results in a decreasing distance $\Delta x$. Alternative examples for the function P include $P=w^2$ and $P=e^w$.

"Distance" between two nodes g and h is defined in terms of link strength w(g, h). When link strengths are asymmetric, so that $w(g, h) \neq w(h, g)$, then the function P needs to conform to a relation in Equation 3 (Eq. 3):

$$\text{slope from } g \text{ to } h = (\Delta y/\Delta x)(g \to h) = (v(h) - v(g)) \cdot P[W(w(g,h),w(h,g))] \quad \text{Eq. 3}$$

In Eq. 3, W is a closeness measure which is derived from the two link strengths w(g, h) and w(h, g). There are many possible ways to convert two link strengths to a single closeness measure. Examples include:

$$W = [w(g,h)+w(h,g)]/2$$

$$W = \max[w(g,h),w(h,g)]$$

$$W = \min[w(g,h),w(h,g)]$$

$$W = w(g,h)$$

The first possibility is the average link strength for the two directions; it may be used with good results for communication networks where the asymmetry is not important. The second possibility may be the best for preventing catastrophic failure, where a conservative approach is to use the maximum probability of failure transmission. The third approach in contrast may be best when the asymmetric link strengths measure affinity or friendship. The last mentioned possibility recognizes that, when node g is seeking its steepest-ascent neighbor, its "local" view of link strength may be best—for example, in the WWW where the hyperlinks are completely asymmetric (1 or 0), it may be preferable to choose h as g's highest neighbor only if g points to (knows about and recommends) h.

In some embodiments, it is convenient to define a distance measure $\Delta x$, and then determine the weight w of a link using this distance measure, for example $w=1/\Delta x$. The distance between two nodes is then beneficially defined according to some property of the nodes or of the link itself, depending on contemplated uses.

For example, a weight w of a link between two documents may be defined as a similarity of the two documents, for example as described in a published international PCT application WO 2006/033763 which is hereby incorporated by reference. Hence, an analogous distance between the two documents may be defined in terms of a similarity between the documents, for example an occurrence of potentially similar words in the documents; for example two theological documents may each refer to philosophers Kierkegård, Sartre and Plato. Alternatively, the distance can be defined as being a deviation between respective contents of the two documents. Accordingly, a small deviation analogous to a short distance may result in a strong link. The weight w can be determined by similarity between words as mutually mapped via an electronic Thesaurus for example; such a determination is important when searching in text databases comprising many thousands or millions of documents. The weight w can also be used to determine a probability of a given sequence of words appearing in sequence in an oral utterance, thereby assisting to enable trajectory analysis of human speech to be implemented more effectively.

As will be described in greater detail later, embodiments are susceptible to being employed to associate documents even though an actual information exchange between the documents does not occur in practice. Such embodiments are thereby susceptible to being adapted for performing selective searches in document databases, for example relational databases, and thereby providing a basis for constructing a highly efficient search engine. Applications of such search engines include Internet search engines, libraries for performing book searches, program searches in relation to interactive cable Internet television services, and so forth.

As disclosed in a published international PCT patent application WO 2005/064850, other examples of how link strength or distance between two nodes is susceptible to being defined include at least one of:
(a) an amount of data transferred between two nodes in a data network, for example an amount of data exchange occurring between nodes in a telecommunication network; and
(b) a number of connections that have been established between two nodes, for example a number of wavelength division multiplexed (WDM) optical fiber links provided between nodes of an optical fiber telecommunications network.

It will be appreciated that other measures of strength or distance are within the scope of this disclosure. Further examples of determining link weights in various networks will be described below.

Aforementioned Equation 2a (Eq. 2a), Equation 2b (Eq. 2b) or Equation 3 (Eq. 3) are optionally employed in STEP 3 above to improve the steepest-ascent graph (SAG). Equation 3 (Eq. 3) may potentially result in a different SAG from that obtainable using Equation 1 (Eq. 1).

A steepest ascent neighbor to a given node 20 will always have a higher EVC than the given node. A consequence thereof is that an assignment of a node 20 as a center, namely a node with no neighbors having a higher EVC, will not be affected by a new definition of a slope relating thereto. This results in the same set of center nodes as the method as disclosed in the international PCT patent application no. WO 2007/049972, and, consequently, a same number of regions being identified.

Figure 2:
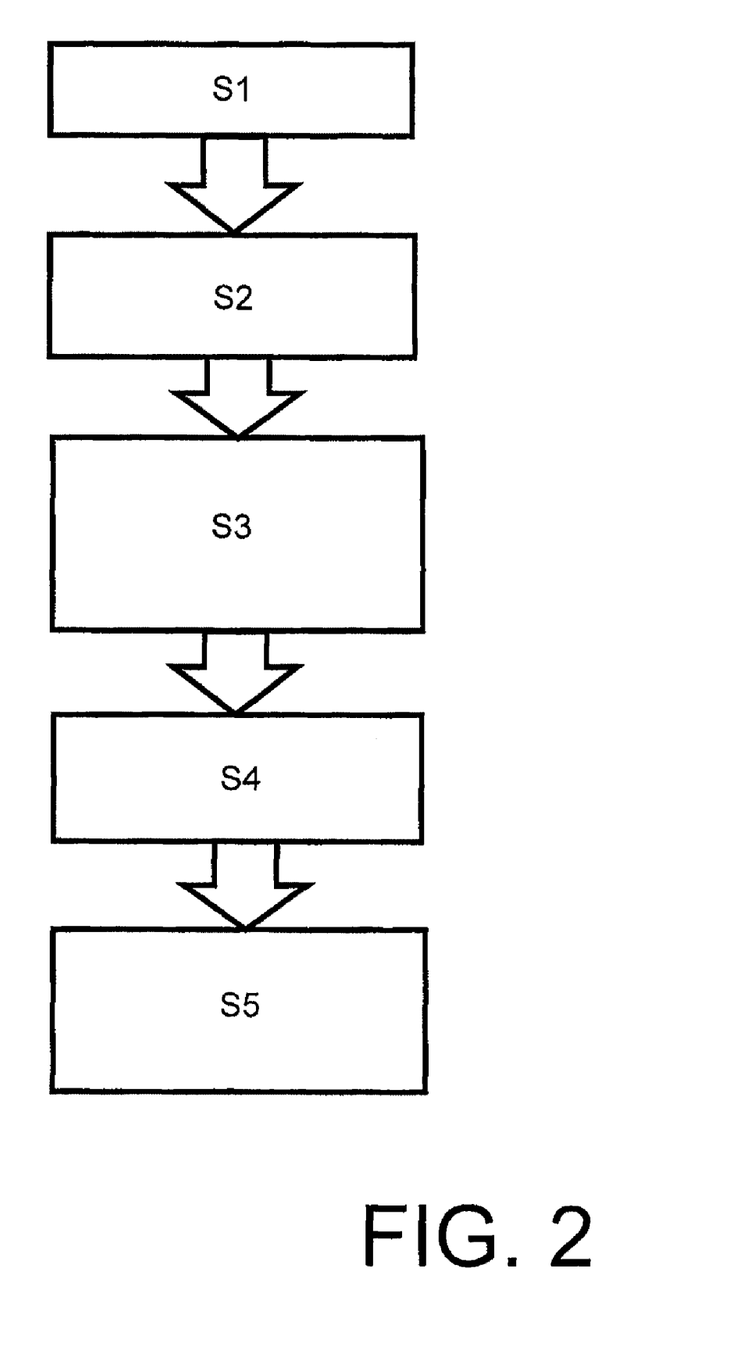
FIG. 2 is a flow diagram illustrating an embodiment of the present invention.

In FIG. 2, there is shown a flow chart of steps S1 to S5 of a method of determining a SAG. The steps S1 to S5 correspond to operations as defined in Table 1.

TABLE 1

Definition of steps S1 to S5 in FIG. 2

| Step | Operation |
|---|---|
| S1 | Map network topology to matrix A |
| S2 | Calculate Eigenvector e from matrix A; EVC (node i) = e (i) |
| S3 | For each node g and each neighbouring node h to node g: Calculate slope = (EVC(h) − EVC(g)) · P [w(g, h)] |
| S4 | Find h* = neighbour with steepest ascent from node g |
| S5 | Form matrix Ã by setting the matrix Ã(g, h*) = 1; if node g has no higher neighbours, set Ã(g, g) = 1 |

It is to be noted that step S2 concerns calculation of the Eigenvector e for the matrix A.

In a step S1, the network 10 is mapped to an adjacency matrix A. In an embodiment, the adjacency matrix element $A_{i,j}$=w(i, j) representative of the link strength between nodes i and j.

Then, in step S2, a principal Eigenvector e of the matrix A is calculated, wherein e(i) is the EVC of node i, namely EVC(i).

Then, in step S3, for each neighboring node h of a node g, the "slope" to node h is beneficially calculated from (EVC(h)−EVC(g))·P[w(g, h)], wherein w(g, h) is the weight of link(g, h) and P is a function. As described earlier, a polynomial function of difference in EVC values may alternatively be employed for computing the slope. As mentioned above, the weight of the link may be derived from one or more properties of the nodes 20 themselves or the link 30, 50 between them, in dependence of what the nodes 20 and links 30, 50 represent in a particular embodiment.

Figure 3:
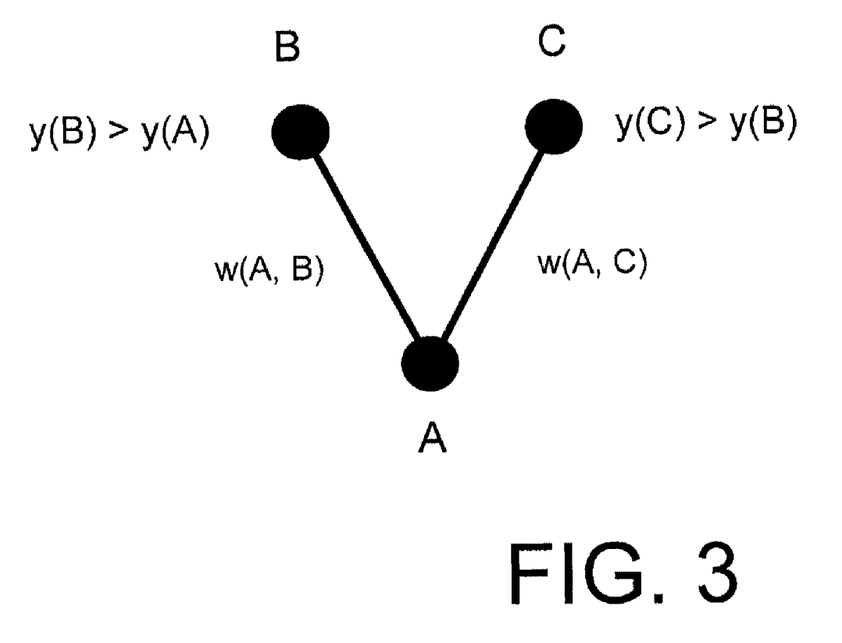
FIG. 3 is an illustration relevant to an application of the present invention.

In step S4, a matrix $\tilde{A}$ is formed, wherein $\tilde{A}_{i,j}$=1 if the slope between nodes i and j is the steepest slope>0, namely an ascent, from the node i, and wherein $\tilde{A}_{i,j}$=1 if the node i has no neighboring nodes with higher EVC. In other words, $\tilde{A}_{i,j}$=1 if (EVC(j)−EVC(i))·P[w(i, j)] is the largest value computed for i for all j. The effect is illustrated in FIG. 3, wherein a node A has two neighboring nodes B and C. For these nodes A to C:

EVC(C)=y(C)>EVC(B)=y(B)>EVC(A)=y(A), wherein the link weights w are assumed to be w(A, B) and w(A, C).

According to the method as described in the international PCT patent application WO 2007/049972, based on Equation 1 (Eq. 1) and ignoring link weights when determining aforesaid slope, the node C will be identified to be the steepest-ascent neighbor of the node A, on account of Eigenvector centrality (EVC) of the node C being larger than that of the node B in this particular example. So, even if the link between the nodes A and C is very weak, the node A will be regarded as being in the same region as the node C.

Alternatively, if aforementioned Equation 2a (Eq. 2a), Equation 2b (Eq. 2b) or Equation 3 (Eq. 3) is applied, the two ascents from the node A to the nodes B and C respectively may be defined as (EVC(B)−EVC(A))·P[w(A,B)] and (EVC(C)−EVC(A))·P[w(A,C)]

respectively. So, if

P[w(A,B)]>P[w(A,C)]·EVC(C)−EVC(A))/(EVC(B)−EVC(A)), then the node A will belong to the same region as the node B. Optionally, computation of P[w(A,B)] is based upon a polynomial of a difference in the EVC values.

Of course, it is possible that the nodes B and C both belong to the same region by being linked to further nodes that ascend toward the same center node of the region, in which case, the node A will also belong to that same region. However, even for nodes in the same region, the definition of ascent will influence paths leading from a node to the center node of the region. For example, in FIG. 3, the path from the node A to the center node of the region may potentially pass through the node B instead of the node C.

Figure 4:
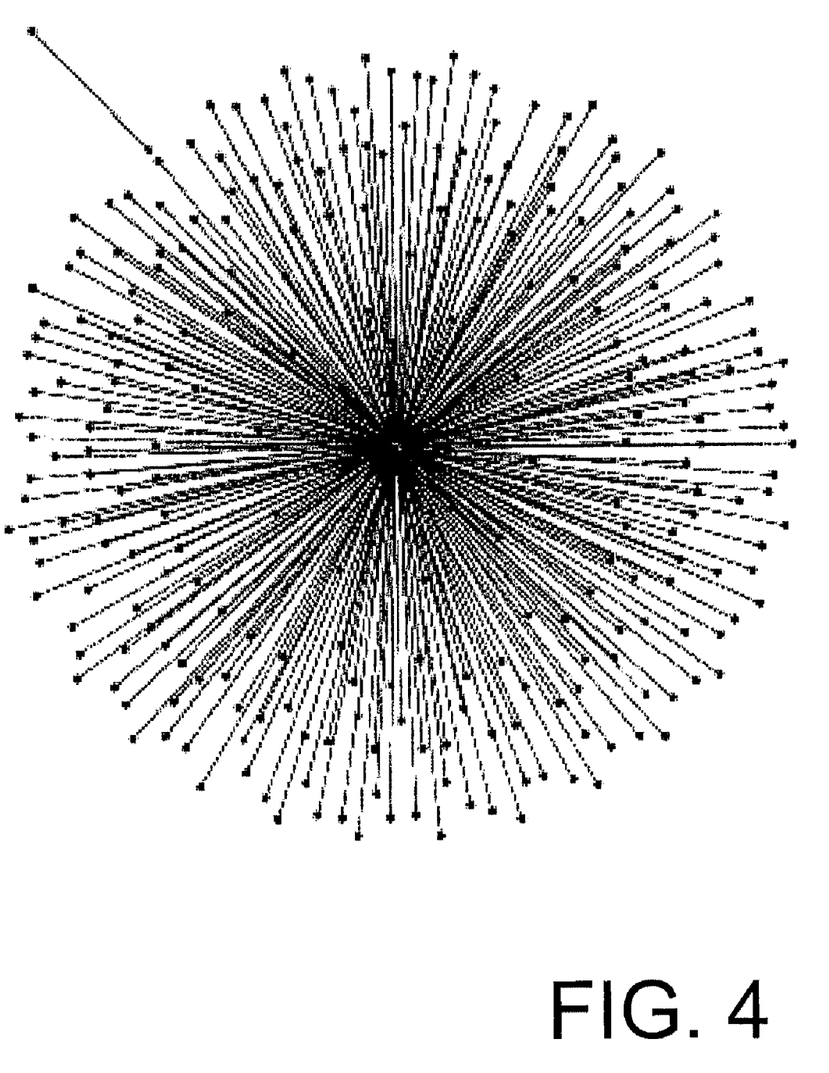
FIG. 4 is a conventional steepest ascent graph (SAG) of a document cluster.
Figure 5:
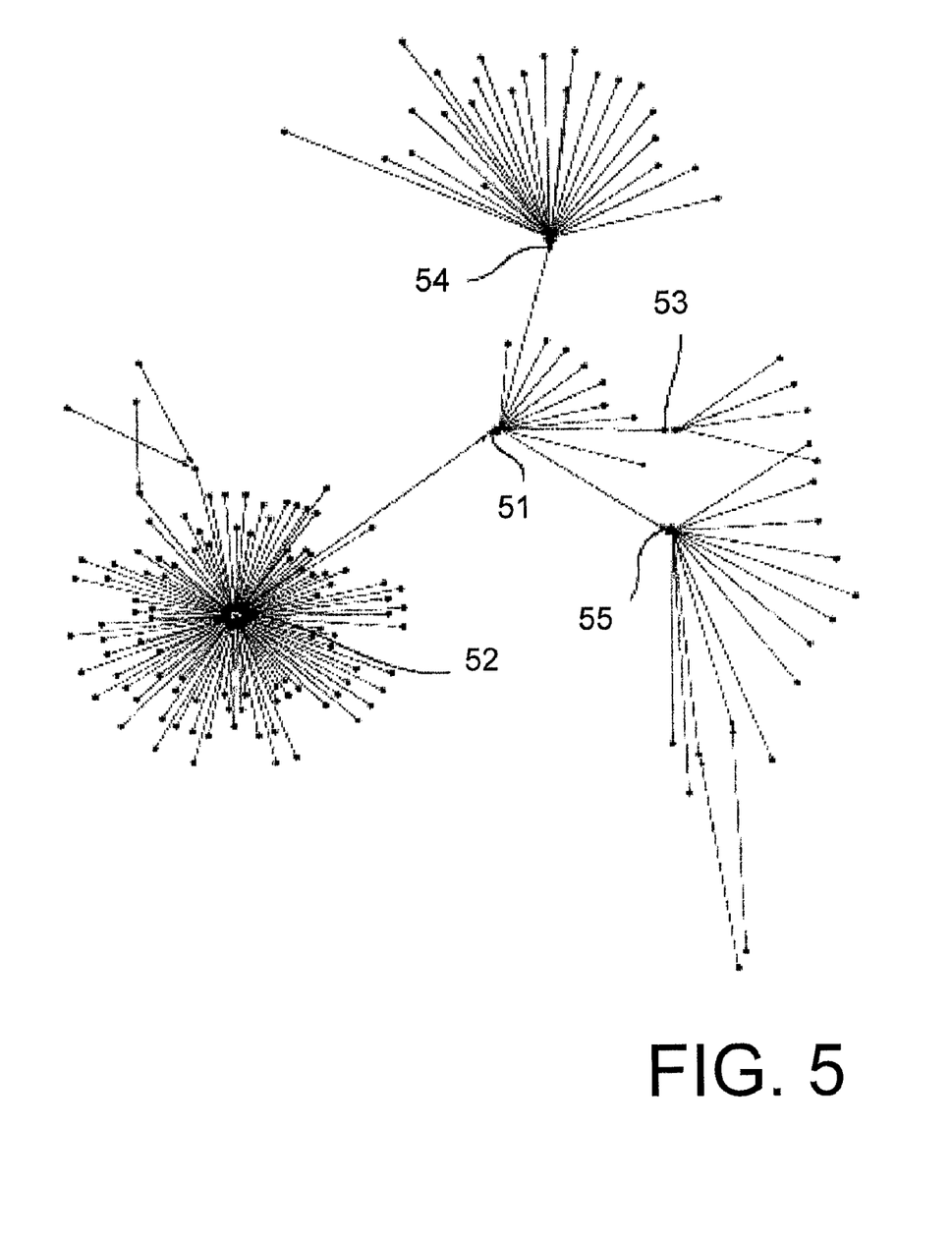
FIG. 5 is a steepest ascent graph (SAG) of the document cluster pertinent to FIG. 4, the ascent graph in FIG. 5 being modified pursuant to an embodiment of the present invention.

FIG. 4 is an illustration of a visualization of a network pursuant to known Eigenvector centrality analysis as described in the foregoing. In comparison, FIG. 5 is an illustration of an alternative visualization of the same network as FIG. 4 except that the "slopes" have been modified by a factor provided by the aforesaid polynomial P having the weight was its input parameter. Comparison between FIGS. 4 and 5 demonstrates detection of structure in the network which would be undetectable using conventional Eigenvector analysis techniques.

In FIG. 4, there is illustrated a SAG obtained by taking top two hundred and fifty hits from a search engine hit list, with the search keyword being "bjørn"; the keyword is both a Norwegian word meaning "bear" in English, and a very common Norwegian name. The SAG shown in this FIG. 4 has almost no structure, since all of the hits but one have a non-zero link to the most central hit, namely a hit (node) represented by a central dot in FIG. 4; a direct steepest-ascent path to this center is susceptible to be computed then using Equation 1 (Eq. 1).

In FIG. 5, there is shown the SAG for the same hit list as pertains to FIG. 4, but with a difference that the SAG is defined for FIG. 5 using Equation 2b (Eq. 2b). Considerably more structure is visible in FIG. 5 in comparison to FIG. 4. In particular, a Center node 51 has clearly obtained most of its centrality from a highly central node 52. The latter node 52 lies centrally to a large number of other nodes, namely hits. The hits in this group as illustrated in FIG. 5 are not clearly focused around any clear theme. However, it would appear that node 51 itself represents a sub-theme in the hit list; by inspecting the hits, it is evident that six of the eight neighboring nodes of the node 51, not counting the node 52, are associated with a model car club; the model car club is also, as it turns out, all of the node 53's downhill neighboring nodes.

Similarly, by examining the hits which connect to a node 54 in FIG. 5, namely at an upper part of FIG. 5, it is found this set of hits is focused around the name "Bjørn", namely not just people having that name, but the name itself. None of the nodes 51 to 55 which clearly distinguish themselves in FIG. 5 are distinguished in any way in FIG. 4, with an exception of course the Center node 51. Furthermore, the sub-themes which are revealed in the SAG of FIG. 5 are invisible in the SAG of FIG. 4.

Thus, it is clear that the SAG illustrated in FIG. 5 derived using Equation 2b (Eq. 2b) is susceptible to providing considerably more information regarding a structure of a document set in comparison to the SAG illustrated in FIG. 4 derived using Equation 1 (Eq. 1). By implication, a similar result is susceptible to being obtained in respect of a social network with weighted links.

Also, the useful information which is gained may in many cases be presented in a visual form, for example on a computer screen or on paper. This may be readily appreciated by viewing FIGS. 4 and 5. Such visualizations may be useful for all applications involving humans—including for example document sets as shown in FIGS. 4 and 5, social networks, communication networks, and so forth.

Having elucidated in the foregoing operation of a method of analyzing a network of nodes connected by links, several examples will now be elucidated.

Example 1

A social network can be represented in a technical domain, by using nodes to represent people; a link between a pair of nodes is used to represent a social relationship between two people. Several such representations of social interaction exist today, for example on-line Internet communities are merely one example. Such on-line communities include, for example, a simple measure of the strength, namely weight, of connection between connected members of the communities, for example based on:

(a) how frequently two members of the communities interact;

(b) how much information that is exchanged between the members, and so forth.

By gathering information regarding members of the community and acquiring information indicative of their interaction, nodes of a social network are susceptible to being identified together with the weights w linking or otherwise associating the nodes together in the network pursuant to aforesaid STEP 1. The Eigenvectors for the social network are provided, for example computed or retrieved from a memory with pre-computed Eigenvectors for the social network, and then slopes are scaled by the aforesaid polynomial P as a function of corresponding weights was in Equation 2a (Eq. 2a), Equation 2b (Eq. 2b), or Equation 3 (Eq. 3). Thereafter, it is possible to determine steepest ascent graphs (SAGs) and thereby determine a network representation in a general manner as illustrated, for example, in FIG. 5.

When the social network has been analyzed by employing Eigenvector "slopes" scaled pursuant to the polynomial P with associated weights as input parameters, it is then possible to identify critical flows of information within the network, or critical relationships within the social network. In an event that it is desired to control the network, for example:

(a) to disseminate information via the network; and/or (b) to hinder information flow within the network.

Knowledge of critical links is beneficial because information can be selectively injected at the links or the critical links in the network, or critical links of the network can be selectively interrupted, for example to reduce information dissemination such as data virus spreading. When the links represent social interaction susceptible to spreading diseases such as tuberculosis, bird influenza and/or AIDS, knowing which links in the network are critical from the analysis discussed above provides a technique to limit spreading of dangerous diseases, for example via airports, railway stations and shopping centers. Embodiments such as Example 1 clearly have many practical applications.

Example 2

Members in a social network are susceptible to being characterized by their profiles which can be used to determine strengths, namely weights, between the members, namely following the same principles as a similarity measure between two documents discussed above. Based on one such measure of weight between nodes, a method may be used to analyze the social network. Members may be given meaningful information both about their "status", namely equivalent to EVC, and about the subgroup, namely region, to which they belong. Each region is then beneficially described in terms of its center, or in terms of an "average" profile, with an associated average being taken over k most central members of the region, or even over the entire region. Such analysis may be used to understand and improve information flow within a network comprising a plurality of inter-connected or inter-related nodes.

Profile information is thereby capable of being used to form most suitable teams of people, for example by selecting employees within a commercial company to form a task force to implement a critical commercial project for the company. In such a situation, the employees do not necessary need to know each other in advance and may not necessary have previously exchanged information therebetween. In such case, the links of the network are representative of similarities or other commonly shared profile characteristics of the employees. Such embodiments have application within personnel management for example.

Example 3

Another example of a technical representation of a social network is a communication network, for example a telephone network, an e-mail network, the Internet, a mobile telephone network, and so forth. In such networks, nodes are representative of users, namely subscribers, and links are representative of communication links between these users by exchanging data pursuant to one or more suitable protocols, for example IP, GSM, CDMA, UMTS and so forth. The strength or weight of a link, for example expressed as number of communications per time unit, are beneficially defined to be an average duration of communication, an amount of information communicated per time unit, and so forth. Based on a suitable definition of link weight, a method may be used to analyze and visualize the nodes of the communication network. Such analysis is capable of providing valuable information about a corresponding underlying social network, for example information about telephone subscribers or members of an organization.

In this example we also see the applicability of using height measures v other than the EVC. For example, we suppose that $v(g)$ gives a measure of the probability for person g to adopt a new product. Then a SAG, which is generated as discussed above, will give information on "social network neighborhoods" which are expected to adopt together, if they adopt at all. Large regions of this product SAG represent "hot spots" where adoption is expected to be strong—clearly, useful information.

Other height functions $v(g)$ which represent the probability for some kind of action by the person g can be useful. For example, $v(g)$ can represent the probability that person g is engaged in criminal activity. The resulting SAG will then reveal "criminal hot spots". Many other possibilities for probability $v(g)$ that a person g engages in some activity may readily be envisioned.

Example 4

Another example is used to analyze electrical power distribution networks, and allowing power flows within the electrical power distribution network to be more optimally controlled. Nodes of the network are then susceptible to being defined as power users, sub-station switching nodes and power stations, namely nodes of the network are definable in several categories of function. Since Eigenvector centrality is useful for describing phenomena which can proliferate over the network (for example, diseases, information, or catastrophic failure), a strength for links between nodes may be defined in terms of the probability for propagation of a failure or breakdown from one node to a neighboring node. Critical links can be identified in such an electrical power distribution network, which would have not been clearly identifiable pursuant to conventional methods of network analysis. This allows more appropriate decision to be made regarding control of power flows in operation within the electrical power distribution network to avoid, for example, overloads and blackouts.

The concept of "hot spots" is also applicable in this context: $v(g)$ can represent the probability of failure of node g in the network. This extra information may be exploited in a SAG analysis, giving "breakdown hot spots" which merit special attention or protective measures.

Example 5

When the networks illustrated in FIGS. 4 and 5 are social networks, wherein the link weights indicate strengths of social ties between people, defined in a way as elucidated above, FIG. 5 is susceptible to providing useful insight into substructures of the social networks. If the networks are to be analyzed in order to identify spreading of information or disease therein, a main feature of interest is an infection status of the region, namely:

(a) how close to the center, for example of a region of the nodes, as described in terms of link hops, infected nodes are located;

(b) EVC values of infected nodes; and (c) closeness of the infected nodes to other regions.

If the networks visualized in FIGS. 4 and 5 were a network of potential disease transmission, ignoring the link weights representative of disease transmission probabilities, would fail to reveal important substructure in the network. Efforts to prevent or slow transmission of a disease would be greatly aided by identifying by analysis and subsequent visualization the structure revealed, for example, in FIG. 5. Such analysis and/or visualization provides for analyzing and, optionally, control of spread of diseases amongst human and animal populations.

Similarly, if $v(g)$ represents the probability that a node is infected from outside the network, then this additional information may be exploited using a SAG where the height is $v(g)$. Here we see clearly that the SAG based on EVC gives best insight into likely patterns of spreading within the network, while the hot spots from a SAG based on $v(g)$ as defined here point out regions which are especially vulnerable to infection from outside.

Example 6

Another example is document analysis and sorting, which is highly beneficial to organizations handling large quantities of documents, for example government authorities, hospitals, educational establishments such as universities and colleges, and so forth.

When the nodes are documents, the network may be built up by determining a similarity measure $S(A, B)$ between documents A and B, and allowing the link strength $w(A, B)$ to be an increasing function of $S(A, B)$. A common method for determining $S(A,B)$ is to represent each document by a vector, namely a list of numbers, giving, for example, the frequencies of words or other features in the documents. The similarity measure $S(A, B)$ may then be defined from these document vectors, for example as a termwise product of the frequencies; such termwise products are also known as Hadamard or Schur products of frequency. All types of documents, including multimedia documents such as sounds, pictures, and videos, may be represented in this way, and so may be analyzed by methods using similarity links in the manner described above.

The resulting network, with nodes being documents and link strengths determined from similarity measures, may be analyzed as discussed above. In particular, the steepest ascent graph (SAG), as given by Equation 2a (Eq. 2a), Equation 2b (Eq. 2b) or Equation 3 (Eq. 3), may be determined, using the document's Eigenvector centrality (EVC) for the node height function v. Regions and subregions, as found from this SAG, may then be employed in defining clusters of documents. FIG. 5 shows visually how subregions may be used to define such document clusters.

Thus, in a context of document clustering, a region in a network is susceptible to being characterized:

(a) by a most central document, or by its vector;

(b) by a list of the k most central documents;

(c) by an average vector for these documents; or (d) by a vector which is an average over all documents in the region/cluster.

Example 7

Another approach to document sorting may be obtained by using a height function v for the nodes which is not the nodes' centrality scores, but rather some other measure of the interest or relevance of the document represented by the node. For example, if the documents are selected from a hit list which is generated by a search, then the height function v for each document can be the document's text relevance score (relative to the search query). One then generates "theme hot spots", using the SAG as given by Equation 2a (Eq. 2a), Equation 2b (Eq. 2b) or Equation 3 (Eq. 3). These hot spots may be used to define subthemes within the general theme defined by the search and by the resulting hit list. The subthemes may be characterized using methods similar to those described in Example 6.

Other types of "document hot spots" may be generated. For example, any user-generated measure of a document's value or interest may be used as the height function v. The user may only score a limited number of documents; but, based on this information, all documents may be placed in "user interest hot spots", by setting v=0 for unscored documents, and using document similarities for link strengths.

The inventors have previously described document ranking via link analysis, including an approach in which a "similarity graph" is created; the link analysis is described in a published international PCT patent application no. WO 2006/033763. When implementing the link analysis, the documents are the nodes of the graph, namely network, and links interconnected the nodes are weighted. More specifically, a symmetrical link weight between documents D1 and D2 is simply a computed similarity measure $S(D1,D2)$, namely a measure of a similarity of content included in the two documents. Regions may be found in the document set. Each region corresponds to a set of documents which "belong together" by virtue of sufficiently many strong links lying internally within the region. Such regions thereby represent, for example, a thematic decomposition of the document set; such thematic decomposition is also known as a clustering of the documents. Clustering is useful for many purposes, for example for grouping hits in a hit list generated by a search engine.

Other example applications are feasible.

Example 8

The method of the present invention may also be applied to physical objects. For example, the wines in a seller's or restaurant's inventory may be described via a profile which is stored electronically. These profiles may then be used to compute pairwise similarity scores for the wines, thus making an S graph. The wines in the seller's wine list may then be clustered in a more refined and informative manner using the SAG. Clearly, this application may also be made for any kind of product for which it makes sense to find the similarities between different products, and to find useful ways to group or cluster the products.

Also, scientific objects, such as molecules, genes, species etc. may be clustered in a novel and insightful fashion, only assuming that the scientific objects may be described or characterized in such a way that a sensible similarity measure may be determined. Such clustering is potentially of benefit when designing courses of medical treatment for a patient using a configuration of medicines, wherein a desired medical result in the patient over time is desired whilst simultaneously coping with allergies developing in an individual against specific types of medicines after prolonged use. It is important for a physician to be able to identify related medicines which may provide a similar medical effect whilst invoking different types of hepatic allergy response.

The method according to the present invention is susceptible to being implemented as software, hardware, or a combination thereof. A computer program product implementing the method or a part thereof comprises software or a computer program recorded on a data carrier, for example on a data signal or on a recording medium such as a solid state memory device, optical data disc and/or magnetic data disc. The computer program product is executable on a general purpose or specially adapted computer, processor or microprocessor. The software product includes computer program code elements or software code portions that make the computer perform the method using at least one of the steps according to the inventive method.

Figure 6:
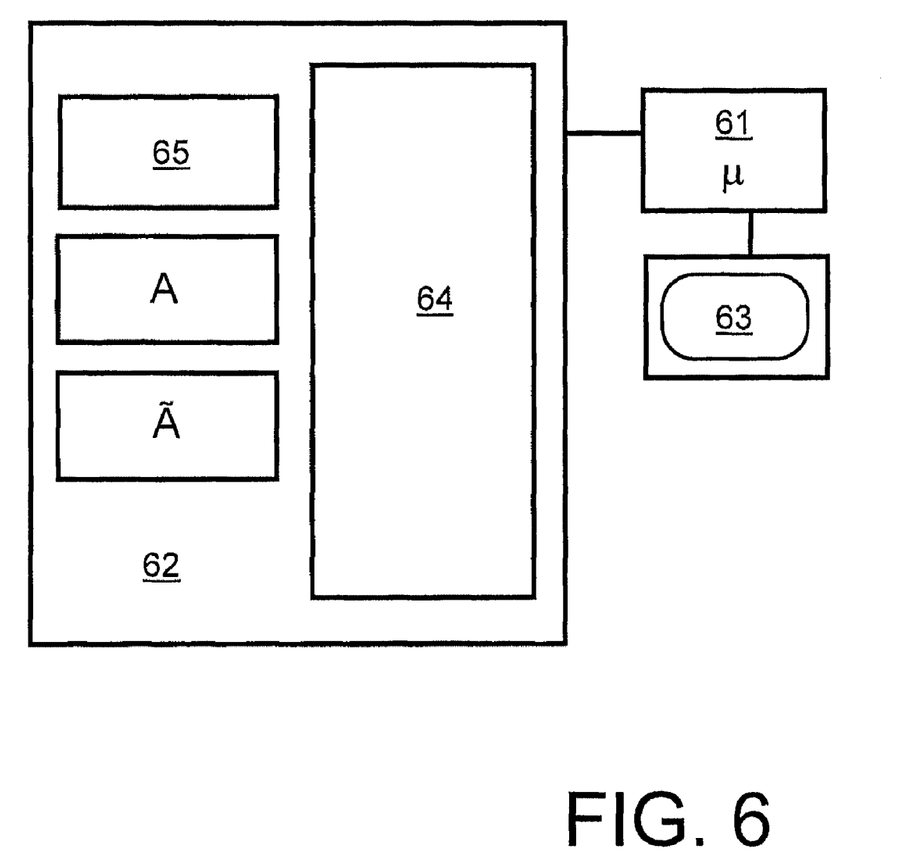
FIG. 6 is a schematic illustration of a system according to an embodiment of the present invention.

A system adapted to perform a method according to an embodiment of the present invention is illustrated schematically in FIG. 6. The system comprises a processor 61 coupled to a memory 62, and optionally to a display 63. The memory 62 is operable to store software 64 for performing a desired analysis pursuant to the present invention. The software may be stored, as elucidated, in whole or part, on, or in, one or more suitable computer readable media or data storage means such as a magnetic disk, CD-ROM or DVD disk, hard disk, magneto-optical memory storage means, in RAM or volatile memory, in ROM or flash memory, as firmware, or on a data server.

The memory 62 is further operable to store in suitable form a representation 65 of a network to be analyzed, monitored and/or controlled. In one example embodiment, the representation is an already prepared matrix A, as described above. Alternatively, the network is first represented by a different data structure provided by a representation 65, and the software comprises a software module adapted to create a matrix A based on the network representation when executed by the processor 61.

The software 64 further comprises:
(a) a module for calculating EVC values for all nodes, for example aforesaid step S2;
(b) a module for determining the slope to all neighbors of each node, for example the aforesaid step S3, and to create the matrix Ã, for example the aforesaid step S4.

When the matrix Ã has been generated, the software 64 further optionally comprises a display module operable to display a visualization on the display 63, for example in a manner as depicted in FIG. 5. Alternatively or additionally, the software 64 optionally comprises a product generation module operable to generate data products comprising graph data representing at least partially matrix Ã, in one or more of the following formats: Graph Markup Language (GraphML), DOT, Scalable Vector Graphics (SVG), Graph eXchange Language (GXL), Graph Modelling Language (GML), the UCINET™ Data Language (DL), and the eXtensible Graph Markup and Modeling Language (XGMML). Generation of such data products enables, for example, easy transfer of generated graph representations across computer networks, such as the Internet.

Modifications to embodiments of the invention described in the foregoing are possible without departing from the scope of the accompanying claims. For example, the mathematical realizations of the inventive principles may be different, and the above description merely serves to give a practical example.

Optionally, when implementing the present invention, it may be desirable that the nodes 20 are subject to pre-filtering for eliminating from computations those nodes 20 which are unlikely to contribute to the steepest ascent graph (SAG), thereby reducing computational load on the processor 61. Additionally, or alternatively, the steepest ascent graph (SAG) is optionally subject to post-filtering to remove links 50 of the steepest ascent graph (SAG) which do not likely determine operation of the network 10. Yet additionally, or alternatively, the nodes 20 are subject to selective filtering during real-time computation, for example when generating a steepest ascent graph (SAG) from the aforesaid matrix A.

As described earlier, the present system is capable of being employed in many practical situations. The present system is concerned with analyzing a network including a plurality of nodes associated and/or connected together by links, the system including a processor coupled to a data memory, wherein the processor is configured to access a first representation of the network and associated link weight measures w in the memory, the system being configured:
(i) to provide node values for the nodes and determine from the node values corresponding slope measures for links existing between the nodes, the slope measures being computed from a function of differences in node values and from the weight measures w for the links, the weight measures w being used for scaling the function of differences in node values;
(ii) to select for at least some of the nodes one or more steepest ascent links having one or more greatest positive slope measures; and
(iii) to generate a second representation corresponding to a steepest ascent graph (SAG) of the network derived from information included in the steepest ascent links.

The second representation is capable of being used for one or more of:
(a) defining and selecting groups of nodes, for which internal spreading is expected to be rapid;
(b) defining and selecting paths (sets of connected links) in the network, over which spreading is expected to be rapid;
(c) acting upon and/or modifying the selected nodes and/or links so as to improve network performance; and
(d) presenting in a display said selected nodes and/or links for informing and supporting human intervention in the network's operation.

Optionally, the first representation is generated by a server analyzing data communication traffic between members in a communication network. The server may be operable to generate weight measures w indicating the existence of relations between the members. The members may be users of communication devices interacting with the communication network. The data communication network may be the Internet, an intranet or a telecommunication network. The telecommunication network may be a mobile telecommunication network. The data communication traffic may be generated by users sending email, instant messages, voice calls or video calls. The weight measures w may indicate at least one of: how frequently the members interact, and how much information is exchanged between the members.

Optionally, the first representation is generated by a server analyzing content generated by members of a data communication network. The server may be operable to generate weight measures w indicating the existence of similarities between the content. The members may be users of communication devices. The content may be member profiles of an online community. The profiles may be user-entered. The first representation may be generated using a combination of traffic and content analysis of the data communication network and its members.

Optionally, the first representation is generated by a server monitoring an electrical power distribution network. The server may be operable to generate weight measures w indicating the probability for propagation of a failure or breakdown from neighboring nodes in the network. The nodes may be at least one of: power users, sub-station switching nodes and power stations.

Optionally, the first representation is generated by a server analyzing statistical data about a plurality of persons. The statistical data may be the result of a survey targeted at the persons. The server may be operable to generate weight measures w indicating the existence and nature of phenomena experienced by respondents of the survey. The phenomena may be diseases.

Optionally, the first representation is generated by a server analyzing a set of electronic documents in a database. The server may be operable to generate weight measures w indicating similarity between the documents. The documents may be retrieved from governmental, medical, or educational records. The documents may be internal to an organization or be publicly available.

Optionally, the first representation is generated by a server analyzing data in a database. The server may be operable to generate weight measures w indicating similarity between characteristics of objects. The objects may be at least one of: molecules, genes, species, goods, materials. The materials may be wines, and the characteristics may be wine tastes.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural.

What is claimed is:

1. A system for analyzing a network including a plurality of nodes associated and/or connected together by links, the system including a processor coupled to a data memory, wherein the processor is configured to access a first representation of the network and associated link weight measures w in the memory, the system being configured:
   (i) to provide node values for the nodes and determine from the node values corresponding slope measures for links existing between the nodes, the slope measures being computed from a function of differences in node values and from the weight measures w for the links, the weight measures w being used for scaling the function of differences in node values;
   (ii) to select for at least some of the nodes one or more steepest ascent links having one or more greatest positive slope measures; and
   (iii) to generate a second representation corresponding to a steepest ascent graph (SAG) of the network derived from information included in the steepest ascent links.

2. The system of claim 1, where said slope measures are computed from a difference in node values scaled by corresponding weight measures w for the links.

3. The system of claim 1, configured to subject the first representation to pre-filtering for eliminating from computations a sub-set of the nodes which do not contribute to the steepest ascent graph (SAG), for reducing a computational load on the processor.

4. The system of claim 1, configured to subject the steepest ascent graph (SAG) to post-filtering to remove links of the steepest ascent graph (SAG) which are irrelevant to determining operation of the network.

5. The system of claim 1, wherein said first representation is a matrix representation of the network and wherein said system is configured to compute the node values by calculating a principal Eigenvector of the matrix representation, the matrix representation including the link weight measures w.

6. The system of claim 1, wherein said processor is configured to determine the weight measures w for links in the network, and to map a topology of the network to an adjacency matrix A describing the network, wherein $A_{i,j}=w(i,j)$ when a link exists between a node i and a node j, and wherein $A_{i,j}=0$ when no link exists between a node i and a node j.

7. The system of claim 6, configured to compute the node values by calculating a principal Eigenvector e of the matrix A, wherein e(i) is the Eigenvector centrality value of node i.

8. The system of claim 1, wherein said processor is configured to compute the node values as Eigenvector centrality values for the nodes, and to determine, for each node g in the network, a slope measure for each link from the node g to an adjacent node h, according to a slope from the node g to the node h being computed from $(EVC(h)-EVC(g))\cdot P[w(g,h)]$, wherein EVC(h) is the Eigenvector centrality value for the node h, EVC(g) is the Eigenvector centrality value for node g, and w(g, h) is the weight measure for the link between the node g and the node h, and P is a function.

9. The system of claim 1, configured, when generating said second representation, to set a pointer from each node i to its neighbor j having a steepest ascent link from the node i.

10. The system of claim 9, configured to generate said second representation by setting a pointer from each node i to itself if it has no positive slope to any of its neighboring nodes.

11. The system of claim 1, configured to generate said second representation by creating a matrix $\tilde{A}$ representing a steepest ascent graph (SAG) of the network, wherein entries of the matrix $\tilde{A}$ corresponding to the steepest ascent links are set to 1, and wherein the matrix element $\tilde{A}_{i,i}$ is set to 1 if the node i has no positive slope to any one of its neighboring nodes.

12. The system of claim 11, configured:
   (a) to multiply a start vector $s_i=i$, wherein i is the node number, with the matrix $\tilde{A}$;
   (b) to repeat the multiplication in (a) until the start vector s converges to a stable vector s*; and
   (c) to derive the region membership of each node from the stable vector s*.

13. The system of claim 12, configured:
   (d) to identify nodes which are local maxima of the steepest ascent graph (SAG) as center nodes;
   (e) to group the nodes into regions surrounding each identified center node;
   (f) to remove the center nodes and the links to the center nodes from the steepest ascent graph (SAG);

(g) to identify neighboring nodes of the center nodes as head nodes; and (h) to group nodes into sub-regions surrounding each identified head node, the nodes of a sub-region being linked to the head node of that sub-region in the steepest ascent graph (SAG).

14. The system of claim 13, configured:

(o) to identify neighboring nodes of the head nodes as sub-subregion head nodes; and (p) to group nodes into sub-subregions surrounding each identified sub-subregion head node, the nodes of a sub-subregion being linked to the sub-subregion head node in the steepest ascent graph (SAG).

15. The system of claim 1, wherein the weight measure w is defined as 1/dist(g, h), where dist(g, h) is a distance measure between the nodes g and h.

16. The system of claim 8, wherein the function P is a monotonically increasing function in response to the weight w increasing.

17. The system of claim 1, wherein the processor is configured to generate a data product corresponding at least partially to said second representation of the network.

18. The system of claim 1, wherein the processor is configured to at least partially present said second representation of the network on a display.

19. The system of claim 1, wherein the processor is configured to apply said second representation for controlling operation of said network.

20. The system of claim 1, wherein the processor is configured to use said second representation for one or more of:

(a) defining and selecting groups of nodes, for which internal spreading is expected to be rapid;

(b) defining and selecting paths (sets of connected links) in the network, over which spreading is expected to be rapid;

(c) acting upon and/or modifying the said selected nodes and/or links so as to improve network performance;

(d) presenting in a display said selected nodes and/or links for informing and supporting human intervention in the network's operation.

21. A method of analyzing a network including a plurality of nodes associated and/or connected together by links, the method employing a processor coupled to a data memory, wherein the processor is configured to access a first representation of said network and associated link weight measures w in said memory, the method comprising steps of:

(i) providing node values for the nodes and determining from the node values corresponding slope measures for links existing between the nodes, the slope measures being computed from a function of differences in node values and from the weight measures w for the links, the weight measures w being used for scaling the function of differences in node values;

(ii) selecting for at least some of the nodes one or more steepest ascent links having one or more greatest positive slope measures; and (iii) generating a second representation corresponding to a steepest ascent graph (SAG) of the network derived from information included in the steepest ascent links.

22. The method as claimed in claim 21, wherein said slope measure are computed from a difference in node values scaled by corresponding weight measures w for the links.

23. The method of claim 21, further comprising a step of subjecting the first representation to pre-filtering for eliminating from computations a sub-set of the nodes which do not contribute to the steepest ascent graph (SAG), for reducing a computational load on the processor.

24. The method of claim 21, further comprising a step of subjecting the steepest ascent graph (SAG) to post-filtering to remove links of the steepest ascent graph (SAG) which are irrelevant to determining operation of the network.

25. The method of claim 21, where said first representation is a matrix representation of the network, the method further comprising a step of computing the node values by calculating the principal Eigenvector of the matrix representation, the matrix representation including the link weight measures w.

26. The method of claim 21, further comprising steps of:

determining the weight measures w for links in the network, and mapping a topology of the network to an adjacency matrix A describing the network, wherein $A_{i,j}$=w(i, j) when a link exists between a node i and a node j, and wherein $A_{i,j}$=0 when no link exists between a node i and a node j.

27. The method of claim 26, further comprising a step of computing the node values by calculating a principal Eigenvector e of the matrix A, wherein e(i) is the EVC of node i.

28. The method of claim 21, further comprising steps of:

computing the node values as Eigenvector centrality values for the nodes, and determining, for each node g in the network, a slope measure for each link from the node g to an adjacent node h, according to a slope from the node g to the node h being computed from (EVC(h)−EVC(g))·P[w(g, h)], wherein EVC(h) is the Eigenvector centrality value for the node h, EVC(g) is the Eigenvector centrality value for node g, and w(g, h) is the weight measure for the link between the node g and the node h, and P is a function.

29. The method of claim 21, further comprising a step of generating in said processor said second representation to set a pointer from each node i to its neighbor j having a steepest ascent link from the node i.

30. The method of claim 29, further comprising a step of generating said second representation by setting a pointer from each node i to itself if it has no positive slope to any of its neighboring nodes.

31. The method of claim 21, further comprising a step of generating said second representation by creating a matrix Ã representing a steepest ascent graph (SAG) of the network, wherein entries of the matrix Ã corresponding to the steepest ascent links are set to 1, and wherein the matrix element $\tilde{A}_{i,i}$ is set to 1 if the node i has no positive slope to any one of its neighboring nodes.

32. The method of claim 31, further comprising steps of:

(a) multiplying a start vector $s_i$=i, wherein i is the node number, with the matrix Ã;

(b) repeating the multiplication in (a) until the start vector s converges to a stable vector s*; and (c) deriving the region membership of each node from the stable vector s*.

33. The method of 32, further comprising steps of:

(d) identifying nodes which are local maxima of the steepest ascent graph (SAG) as center nodes;

(e) grouping the nodes into regions surrounding each identified center node;

(f) removing the center nodes and the links to the center nodes from the steepest ascent graph (SAG);

(g) identifying neighboring nodes of the center nodes as head nodes; and (h) grouping nodes into sub-regions surrounding each identified head node, the nodes of a sub-region being linked to the head node of that sub-region in the steepest ascent graph (SAG).

34. The method of claim 33, further comprising steps of:
(o) identifying neighboring nodes of the head nodes as sub-subregion head nodes; and
(p) grouping nodes into sub-subregions surrounding each identified sub-subregion head node, the nodes of a sub-subregion being linked to the sub-subregion head node in the steepest ascent graph (SAG).

35. The method of claim 21, wherein the weight measure w is defined as $1/\text{dist}(g, h)$, where $\text{dist}(g, h)$ is a distance measure between the nodes g and h.

36. The method of claim 28, wherein the function P is a monotonically increasing function in response to the weight w increasing.

37. The method of claim 21, further comprising the step of generating a data product corresponding at least partially to said second representation of the network.

38. The method of claim 21, further comprising the step of at least partially presenting said second representation of the network on a display.

39. The method of claim 21, further comprising the step of applying said second representation for controlling operation of said network.

40. The method of claim 21, further comprising the step of using said second representation for one or more of:

(a) defining and selecting groups of nodes, for which internal spreading is expected to be rapid;
(b) defining and selecting paths (sets of connected links) in the network, over which spreading is expected to be rapid;
(c) acting upon and/or modifying the said selected nodes and/or links so as to improve network performance;
(d) presenting in a display said selected nodes and/or links for informing and supporting human intervention in the network's operation.

41. An article of manufacture, comprising:

a machine readable storage non-transitory medium; and a program embodied on the storage non-transitory medium, configured for execution by a processor, the processor being coupled to a data memory and configured to generate, in said memory a first representation of a network including a plurality of nodes associated and/or connected together by links;

wherein execution of the program by the processor causes the processor to execute any one of the methods recited in claims 21 to 40.

* * * * *